US008220589B2

(12) United States Patent
Hédé et al.

(10) Patent No.: US 8,220,589 B2

(45) Date of Patent: Jul. 17, 2012

(54) ROPING HARNESS WITH IMPROVED SEAT

(75) Inventors: Jean-Marc Hédé, Domène (FR); Aurélie Lévêque, Annecy (FR); Patrick Lévêque, legal representative, Fontenay le Vicomte (FR); Paul Petzl, Barraux (FR)

(73) Assignee: Zedel, Crolles (FR)

( * ) Notice: Subject to any disclaimer, the term of this patent is extended or adjusted under 35 U.S.C. 154(b) by 351 days.

(21) Appl. No.: 12/457,161

(22) Filed: Jun. 2, 2009

(65) Prior Publication Data

US 2009/0314578 A1 Dec. 24, 2009

(30) Foreign Application Priority Data

Jun. 18, 2008 (FR) ..................................... 08 03421

(51) Int. Cl.
*A62B 35/00* (2006.01)
*A01M 31/00* (2006.01)

(52) U.S. Cl. .......................................................... 182/7

(58) Field of Classification Search .......... 182/7; 297/4, 297/440.24, 249; 472/118, 125
See application file for complete search history.

(56) References Cited

U.S. PATENT DOCUMENTS

| | | | | | |
|---|---|---|---|---|---|
| 567,491 | A * | 9/1896 | Murphy | | 297/378.1 |
| 910,006 | A * | 1/1909 | Lowy | | 182/7 |
| 2,254,179 | A * | 8/1941 | Hoyt | | 182/7 |
| D191,274 | S * | 9/1961 | Williams et al. | | D21/823 |
| 4,546,851 | A * | 10/1985 | Brennan | | 182/7 |
| 6,035,966 | A | 3/2000 | Lewis | | |
| 6,352,307 | B1 * | 3/2002 | Engman | | 297/284.11 |
| D539,554 | S * | 4/2007 | Palasini | | D6/362 |
| 7,658,448 | B2 * | 2/2010 | Birk et al. | | 297/354.12 |
| 7,677,250 | B2 * | 3/2010 | Maurello | | 128/845 |
| 2008/0289903 | A1 | 11/2008 | Kuhnert | | |

* cited by examiner

*Primary Examiner* — Alvin Chin Shue

(74) *Attorney, Agent, or Firm* — Oliff & Berridge, PLC

(57) ABSTRACT

A roping harness is composed of a belt and a supporting seat joined to one another by joining straps, and comprising an attachment device. The seat is provided with means for adjusting the width to suit the user's morphology.

1 Claim, 3 Drawing Sheets

ROPING HARNESS WITH IMPROVED SEAT

BACKGROUND OF THE INVENTION

The invention relates to a roping harness composed of a belt and a supporting seat joined to one another by joining straps and comprising an attachment device. Harnesses of this kind are generally used by professionals working at heights with secured progression on ropes, and in particular by tree trimmers.

STATE OF THE ART

Different harness sizes are proposed by manufacturers according to the weight and sex of the users, and also on the different categories of working at heights. There are generally three or four sizes to cover all the dimensions of each model of a range. This multitude of sizes results in production management and storage problems for the manufacturer, and also in procurement and storage problems for wholesalers.

OBJECT OF THE INVENTION

The object of the invention consists in providing a roping harness having a standard seat providing comfortable support for several different user sizes.

The device according to the invention is characterized in that the seat is provided with width adjustment means to adjust the width of the seat to suit the user's morphology.

According to a preferred embodiment, the seat comprises two telescopic parts mounted sliding in a rigid base, and symmetrical with respect to the vertical mid-plane of the base.

The two parts making up the seat preferably present identical structures each having a raised nose-shaped end-part and a flat surface provided with at least one series of holes for adjusting the width of the seat.

The invention also relates to a seat designed to be associated by straps with a roping harness. The seat is characterized in that it is provided with means for adjusting the width to suit the user's morphology.

BRIEF DESCRIPTION OF THE DRAWINGS

Other advantages and features will become more clearly apparent from the following description of particular embodiments of the invention given for non-restrictive example purposes only and represented in the appended drawings in which.

DESCRIPTION OF A PREFERRED EMBODIMENTS OF THE INVENTION

Figure 1:
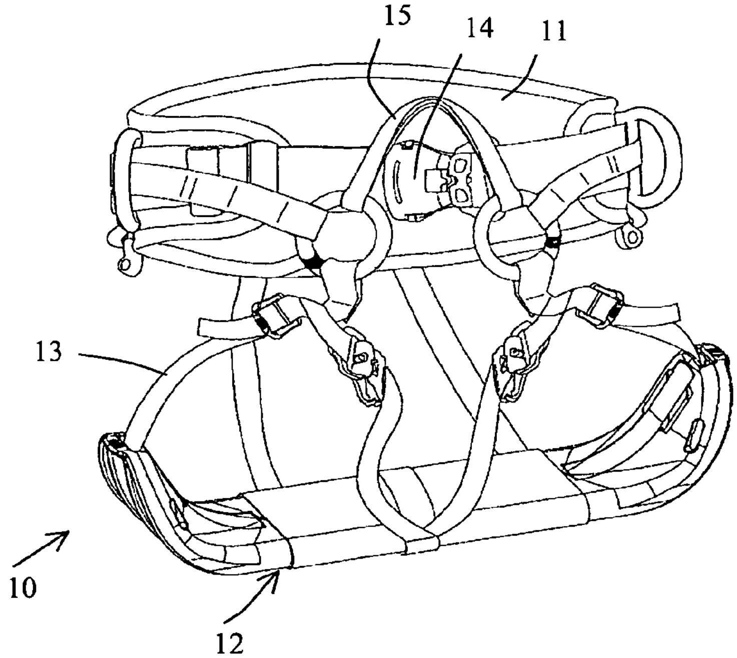
FIGS. 1 and 2 represent perspective views of the harness according to the invention in two adjustment positions of the seat.
Figure 2:
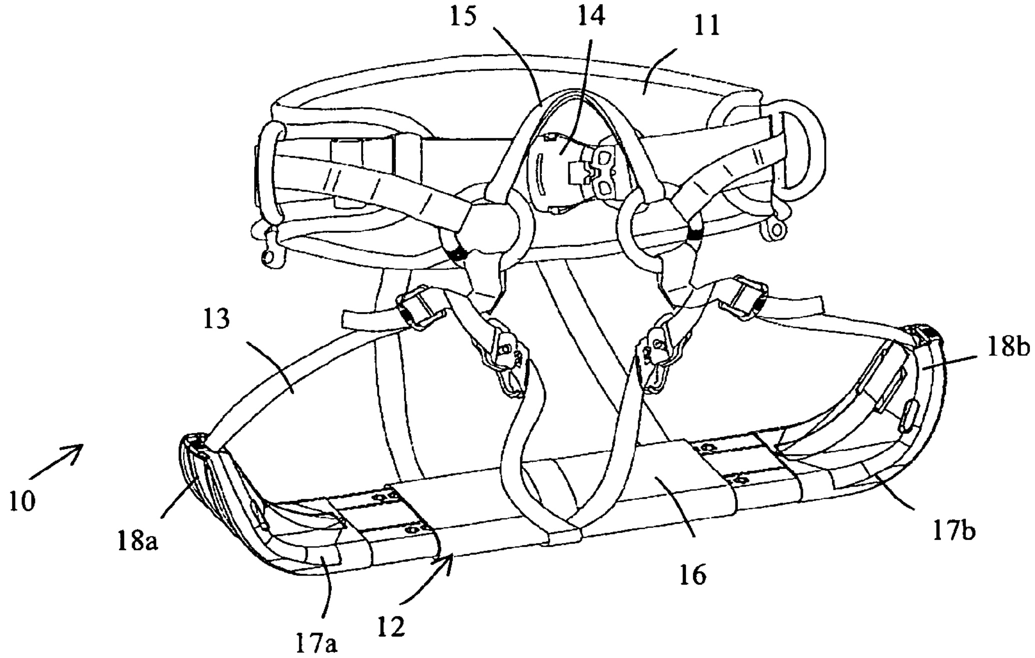

With reference to FIGS. 1 to 4, a roping harness 10 is composed of a belt 11 and a supporting seat 12 joined to one another by joining straps 13. Belt 11 is equipped at the front with a closing buckle 14 and with a ventral attachment device 15.

Straps 13 are shaped as a pair of leg loops to form a sit harness strengthened at the base by the support seat 12 for the user to sit on.

Seat 12 comprises a hollow base 16 arranged as a slide, and two telescopic parts 17*a*, 17*b* housed inside the slide in a manner enabling the width to be adjusted. The two parts 17*a*, 17*b* forming seat 12 present identical structures each having a raised nose-shaped end-part 18*a*, 18*b* salient from the slide and a flat surface 19*a*, 19*b* provided with two series of parallel holes 20*a*, 20*b*.

The rigid base 16 is provided with four holes 21 for securing screws 22 to pass through, the screws then passing through the respective holes 20*a*, 20*b* of telescopic parts 17*a*, 17*b* for adjustment of the width of seat 12.

For example, base 16 is made from metal whereas the two adjustable parts 17*a*, 17*b* are made from injected plastic material. A single mould is required for manufacturing telescopic parts 17*a*, 17*b*.

Figure 3:
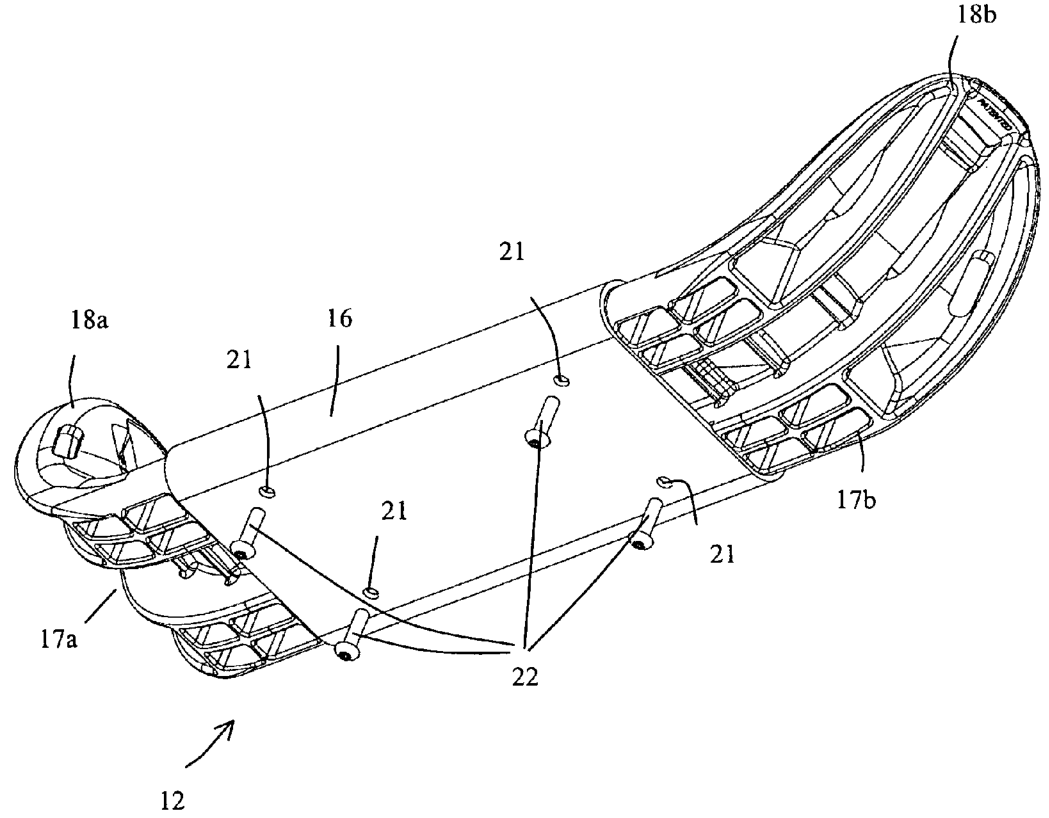
FIG. 3 is a perspective view from underneath of the seat when the fixing screws are fitted for adjustment.
Figure 4:
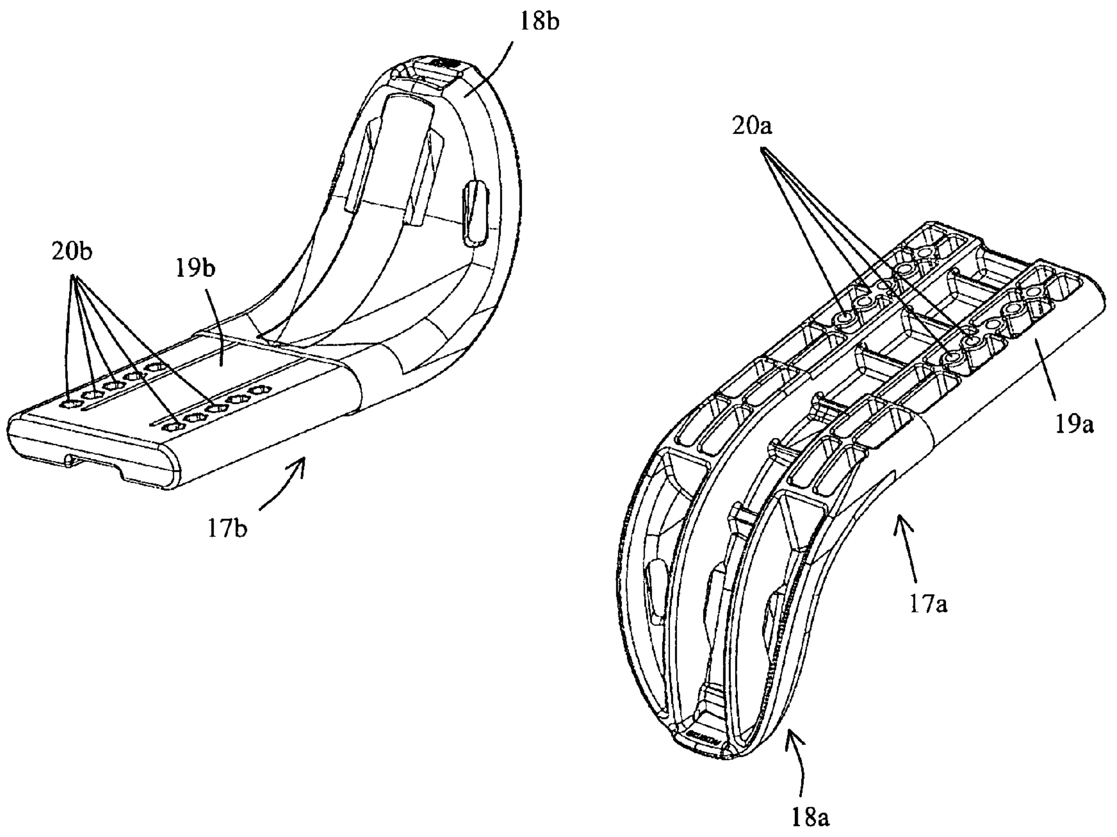
FIG. 4 shows the two identical telescopic parts of the seat after the base has been removed, one of the parts being turned through a half-turn to illustrate the underside.

With reference to FIG. 3, the two opposite parts 17*a*, 17*b* of support seat 12 are symmetrical with respect to the vertical mid-plane of base 16. It is thereby easy to adjust the width of seat 12 to the user's morphology while at the same time ensuring that said seat is centred with respect to the mid-plane.

According to a development of the invention, adjustable-width seat 12 can form a sub-assembly distinct from the harness and be sold separately. It can be joined to any type of harness by means of two attachment straps securedly affixed to nose-shaped end-parts 18*a*, 18*b*.

The invention claimed is:

1. A roping harness comprising:

a belt comprising an attachment device;

a supporting seat joined to the belt by joining straps, wherein the supporting seat comprises two adjustable telescopic parts slidably mounted in a hollow, rigid base;

the telescopic parts being symmetrical with respect to a vertical mid-plane of the base;

the base is provided with apertures for securing screws configured for adjusting a width of the supporting seat; and the two telescopic parts are identical structures each having a raised nose-shaped end-part and a flat planar surface provided with at least one series of holes configured for adjusting the width of the supporting seat, wherein the raised nose-shaped end-part is an upwardly curved extension of the flat planar surface.

* * * * *